CATHODE RAY TUBE CONTROL CIRCUIT

Filed May 21, 1959

INVENTOR.
WILLIAM M. H. WILLIS

BY

ATTORNEY 3,069,593

CATHODE RAY TUBE CONTROL CIRCUIT

William M. H. Willis, St. Joseph, Mich., assignor, by mesne assignments, to Daystrom, Incorporated, Murray Hill, N.J., a corporation of Texas Filed May 21, 1959, Ser. No. 814,726
7 Claims. (Cl. 315—22)

Figure 1:
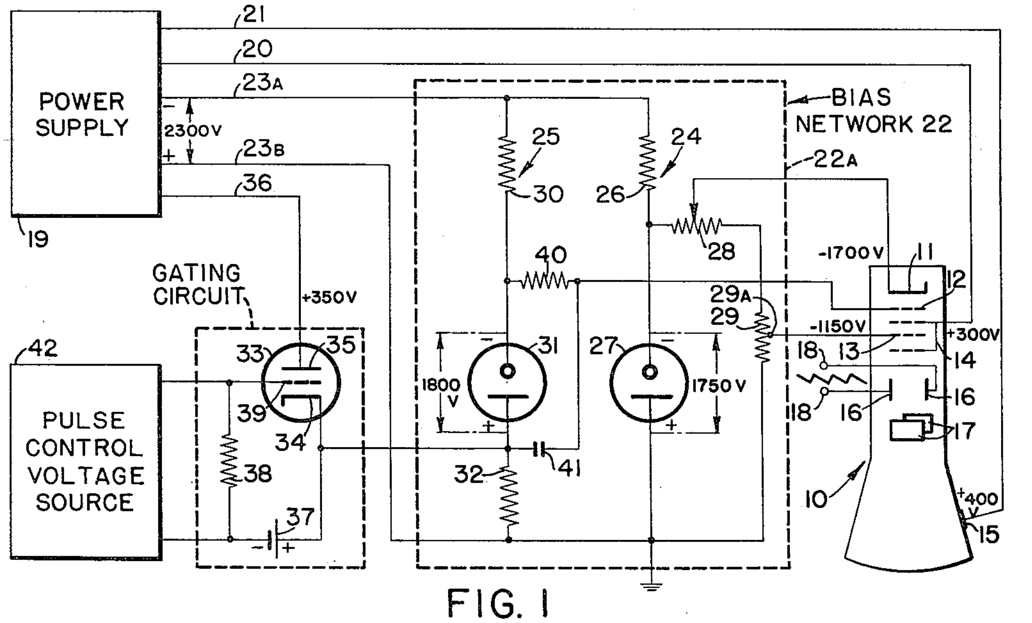

This invention relates to cathode ray tube circuitry and more particularly to circuits for controlling the intensity of the beam in a cathode ray tube.

In applications employing cathode ray tubes, it is usual to provide a means of gating the electron beam off and on in synchronism with a sawtooth wave applied to the horizontal deflection system associated with the cathode ray tube. The beam is gated in this manner to prevent the appearance of undesirable retrace lines on the screen as the beam is returned from the end of one sweep line to the start of the next sweep line.

Two modes of operation are commonly employed for controlling the beam in the foregoing manner. In one mode, the cathode ray tube is maintained in a normally non-conductive or blanked condition and control voltage pulses are employed to unblank the tube during the sweep interval portion of the horizontal scanning cycle. The control voltage pulses in this mode are known as "unblanking" pulses.

In the other mode, the cathode ray tube is maintained in a normally conductive or unblanked condition and control voltage pulses are employed to blank the tube during the retrace interval portion of the horizontal scanning cycle. The control voltage pulses in this mode are known as "blanking" pulses.

In certain applications, such as, for example, oscilloscopes, the cathode ray tube grid and cathode are usually operated at a considerable negative voltage level with respect to chassis ground. Satisfactory overall operation in such applications requires that a D.C. connection path rather than a capacitor path be provided to couple the control voltage pulses directly to the cathode ray tube bias supply circuit.

Some prior circuits for accomplishing this have certain disadvantages, among which are the high cost and complexity resulting from the use of the large number of components necessary in these circuits. Still other prior art circuits of this type are unsatisfactory for the reason that they employ high voltage supplies utilizing an RF oscillator and thus require RF shielding in order to suppress the resulting undesirable radiation. Still other existing circuits are undesirable because of the relatively high amounts of power required for their operation.

It is a primary object of this invention to provide a grid bias potential supply circuit for a cathode ray tube which operates with its grid at a relatively high negative potential with respect to chassis ground, the bias supply circuit including at least a portion of a pulse gating circuit for coupling control pulses from the gating circuit directly into the grid-cathode circuit of the cathode ray tube.

It is another object of this invention to control the operation of a cathode ray tube in such a manner as to render it conductive or non-conductive at predetermined intervals of time in synchronism with a portion of a sawtooth wave applied to the beam deflection system, by the application of pulses to the grid-cathode circuit of the cathode ray tube.

One of the highly desirable features of this invention is the use of relatively uncomplicated circuitry, compared with prior art circuits, for supplying regulated potential and control pulses to the grid-cathode circuit of the cathode ray tube in accordance with the objects set forth above.

A further feature of the invention resides in the lack of a necessity for the special shielding required to suppress the undesirable radiation encountered with various circuits of the prior art.

Figure 2A:
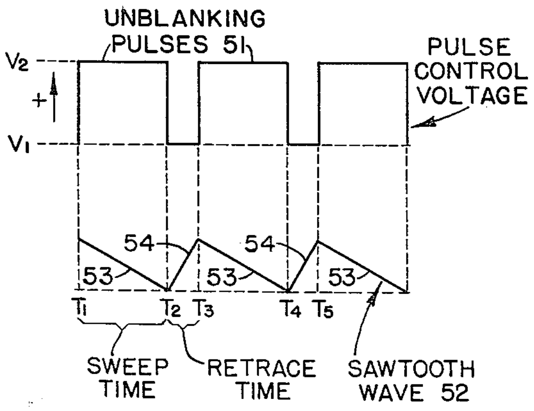
Figure 2B:
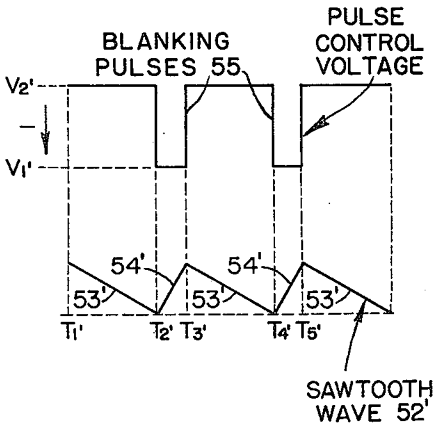

Other objects, features, and advantages of my invention will become apparent from a reading of the specification taken in conjunction with the accompanying drawings, in which:

FIGURE 1 is a schematic wiring diagram of a circuit employing the principles of my invention;

FIGURE 2*a* is a representation of an "unblanking" control voltage pulse waveform shown in synchronism with a sawtooth wave applied to the horizontal deflection system, and used in one mode of operation of the invention;

FIGURE 2*b* is a representation of a "blanking" control voltage waveform shown in synchronism with a sawtooth wave applied to the horizontal deflection system, and used in another mode of operation of the invention.

Briefly stated, my invention contemplates a cathode ray tube and a gride bias potential network connected essentially between the grid and cathode thereof. The invention further includes the use of a control voltage pulse gating circuit having therein a pulse developing impedance, which also forms a part of the bias potential network. This impedance serves as a coupling means between the gating circuit and the bias network for coupling pulses directly from the gating circuit to the grid ciruit of the cathode ray tube.

In accordance with one mode of operation of the invention, the cathode ray tube is maintained in a blanked condition in the absence of control voltage pulses supplied to the gating circuit. Pulses are applied in synchronism with the sweep interval portion of the horizontal scanning cycle to unblank the cathode ray tube during that interval.

In accordance with another mode of operation, the cathode ray tube is maintained in an unblanked condition in the absence of control pulses applied to the gating circuit. Pulses are applied in synchronism with the retrace interval portion of the horizontal scanning cycle to blank the cathode ray tube during that interval.

Referring now to FIGURE 1, there is a cathode ray tube 10 having a cathode 11, a control grid 12, a focusing element 13, and astigmatism element 14 and an accelerating anode 15. Horizontal beam deflecting plates 16 and vertical beam deflecting plates 17 are also provided in the tube. The horizontal plates are connected to a pair of terminals 18 for receiving a sawtooth wave to effect proper scan of the tube screen by the beam within the tube.

A power supply 19, shown in block form, is provided for supplying appropriate potentials to the various cathode ray tube elements for proper operation of the tube. All of the potential values referred to herein and shown on the drawing are values taken with respect to chassis ground as zero potential. A wire 20 provides a suitable positive potential from the power supply 19 to the astigmatism element 14 and a wire 21 likewise provides a suitable positive potential for the accelerating anode 15.

In further accordance with my invention, there is provided a grid bias potential supply network indicated generally by the numeral 22 and including the components enclosed within the area defined by the dotted lines **22*a*. This network is connected to the power supply 19 by means of wires 23*a* and 23*b*. The potential between these wires is a relatively high value, such as for example 2,300 volts D.C. The line 23*a* is negative with respect to the line 23*b***, the latter being connected to chassis ground.

The potential network 22 provides the bias potential on the control grid 12 with respect to the cathode 11. This network includes two circuit legs 24 and 25, each of which is connected between the lines 23*a* and 23*b*. The leg 24 comprises a limiting resistor 26 connected in series with a corona discharge voltage regulator tube 27, the latter being bridged by a potentiometer 28 in series with a resistor 29.

The limiting resistor 26 is provided to limit the current through the voltage regulator tube 27. This tube is designed to maintain a constant potential difference of approximately 1,750 volts between its cathode and anode despite substantial changes in the potential between the wires 23*a* and 23*b*. The potentiometer 28 is employed to vary the potential on the cathode 11 over a small range so that the proper operating bias potential between the grid 12 and cathode 11 can be accurately fixed. The resistor 29 serves to establish a potential drop between the ground leg of the network (line 23*b*) and the lower end of the potentiometer 28 so that the potential change on the cathode produced by changes in the setting of the potentiometer 28 will remain within reasonable limits. In addition, the resistor 29 serves as a convenient means for obtaining the proper operating potential for the focusing element 13 merely by providing a tap 29*a* thereon.

The network leg 25 includes a limiting resistor 30, a corona discharge voltage regulator tube 31 and a pulse developing impedance such as a resistor 32, all in series.

The limiting resistor 30 serves to limit the current through the regulator tube 31 just as the resistor 26 limits current through the regulator tube 27. The tube 31 is designed to maintain a constant potential difference of approximately 1,800 volts between its cathode and anode, despite substantial changes in the potential between the wires 23*a* and 23*b*. Together the regulator tubes 27 and 31 insure a constant potential between the cathode 11 and grid 12 in the absence of a potential developed across the resistor 32. There is a still further important function of the tube 31 which will be described after the description of operation.

The function of the resistor 32 is to effect changes in the grid-cathode potential of the cathode ray tube, to thus blank and unblank the cathode ray tube in synchronism with a sawtooth wave applied to the horizontal deflection system as will subsequently be explained. This resistor forms part of the D.C. path from the cathode 11 to the control grid 12. In order to effect changes in the cathode ray tube bias, the resistor 32 also serves as the cathode resistor for an electron flow device in the form of a pulse gating triode 33 which is part of a gating circuit.

The cathode 34 of this triode serves as the output electrode and is connected to the top of the resistor 32. The plate 35 is connected by a wire 36 to the power supply 19 to provide a potential in the plate sufficiently positive with respect to chassis ground for proper operation of the tube. A D.C. source of biasing potential such as a battery 37 is provided in series with a resistor 38 between the cathode 34 and the grid 39 for applying proper grid bias to the tube 33 to maintain it either normally conductive or non-conductive in accordance with various modes of operation to be described.

The control grid 12 of the cathode ray tube is connected to the cathode of the regulator tube 31 through a resistor 40, and to the top of the pulse developing resistor 32 through a capacitor 41.

A pulse control voltage source 42 is also provided and supplies pulses to the control grid 39 of the triode 33. These pulses render this tube conductive or non-conductive at predetermined intervals in synchronism with portions of the sawtooth wave in accordance with various modes of operation.

With the voltage regulator tubes 27 and 31 connected as shown, and the potentiometer 28 set at its topmost position, it is apparent that the voltage measured from the cathode of tube 27 to the cathode of tube 31 will be 1,800 volts (the potential across tube 31) minus 1,750 volts (the potential across tube 27) or 50 volts, assuming the drop across the cathode resistor 32 to be negligible. This 50 volt potential biases the control grid 12 of the cathode ray tube sufficiently negative with respect to the cathode 11 to substantially cut off the cathode ray beam and thus blank the tube. This will be the condition when there is no signal being developed across the triode cathode resistor 32.

Two modes of operation of the invention will now be discussed, viz., a first mode, whereby the pulse control voltage from the source 42 comprises unblanking pulses and a second mode whereby the pulse control voltage from the source 42 comprises blanking pulses. In accordance with the first mode of operation, the triode 33 is maintained in a normally non-conductive condition by fixing the potential from the D.C. potential source 37 at a value $V_1$ (see FIG. 2*a*), so that no signal potential is developed across the cathode resistor 32 in the absence of a positive signal on the triode grid 39.

When, however, a pulse control voltage, FIG. 2*a*, from the pulse source 42 comprising positive going unblanking pulses 51 having an ultimate value $V_2$ and recurring at regular predetermined intervals is applied to the triode 33, this tube will become conductive for the duration of the pulse, i.e., for times $t_1$—$t_2$, $t_3$—$t_4$, etc. As a result of the tube 33 being rendered conductive, a cathode current passes through the cathode resistor 32 and develops a potential drop across this resistor which is positive at the top thereof. This potential drop has a polarity and value such as to reduce the bias on the cathode ray tube below the cutoff point and thus restore the beam therein, thereby unblanking the cathode ray tube.

The pulses 51 are applied in synchronism with the sweep intervals 53 of the sawtooth wave 52 so that the cathode ray tube is unblanked each time the cathode ray tube beam sweeps across the tube screen. A line is thus produced on the screen each time a pulse 51 occurs.

During the time intervals between the pulses 51 viz., $t_2$—$t_3$, $t_4$—$t_5$ etc., the cathode ray beam is on the retrace portion of the scanning cycle. Since during these intervals there are no pulses applied to the triode 33, the cutoff bias is then effective and the triode is non-conductive. Hence, for the beam retrace interval, there is no bias-opposing potential drop developed across the resistor 32 and the cathode ray tube beam remains cutoff so that the beam does not sweep out a retrace line.

In accordance with the second mode of operation, the triode 33 is maintained in a normally conductive condition by fixing the potential from the D.C. potential source 37 to a value $V_2$, see FIG. 2*b*. As a result a potential drop will be developed across the cathode resistor 32 which has a polarity and value such as to reduce the bias on the cathode ray tube below the cutoff point and thus allow the beam to impinge the cathode ray tube screen.

If now a pulse control voltage, FIG. 2*b*, is fed to the triode 33 from the pulse source 42, it will be apparent that the cathode ray tube will be unblanked during the intervals $t_{1'}$—$t_{2'}$, $t_{3'}$—$t_{4'}$, etc., since the potential on the triode grid 39 during these intervals has a value $V_{2'}$. During the intervals $t_{2'}$—$t_{3'}$, $t_{4'}$—$t_{5'}$, etc., however, negative going blanking pulses 55 having an ultimate value $V_{1'}$ are applied to the triode 33 and render it non-conductive. As a result the bias-opposing potential drop across the cathode resistor drops to zero, thereby returning the cathode ray tube grid 12 to cutoff potential. This, of course cuts off the beam, thus blanking the tube.

In this second mode of operation, the blanking pulses 55 are applied in synchronism with the retrace interval 54' of the sawtooth wave 52' applied to the horizontal deflection plates 16. It is thus apparent that the cathode ray tube beam sweeps out a line during the sweep interval portion of the sawtooth wave and that the tube is blanked during the retrace interval.

It will now be appreciated that by the circuit of this invention, the cathode ray beam can be sequentially gated on and off by conductively coupling gating pulses directly into the grid bias potential network from the gating circuit, i.e., without the use of a capacitor. Thus the gating pulses appear across the resistor 32 and thus directly affect the cathode ray tube grid bias since this resistor is a part of the D.C. bias path between the cathode 11 and control grid 12.

Particular attention should be directed at this point to the inclusion of the capacitor 41 in the circuit. The original circuit did not include this capacitor, but with that circuit it was found that there was a loss in the intensity of the line at the beginning of each trace. This phenomenon was due to two factors: (*a*) the high impedance of the tube 31 and resistor 40 between the top of the resistor 32 and the cathode ray tube grid 12 and (*b*) the relatively low impedance of the control grid 12 due to the input capacity of the cathode ray tube. As a result, there was a time delay which prevented the pulse across the resistor 32 from having an immediate unblanking effect on the cathode ray tube at the beginning of each trace interval. This problem was, however, solved by including the capacitor 41 to provide in effect a path of low impedance for the leading edge of the unblanking pulse appearing across the resistor 32, thus allowing immediate unblanking of the cathode ray tube.

It is important for satisfactory operation that the regulator tube 31 be employed in the bias network leg 25. Its use insures that the potential change between the control grid 12 and chassis ground (and therefore also between the control grid and cathode 11) will be a function only of the potential developed across the resistor 32. This would not be the case if the tube 31 were to be replaced by a resistor, for example.

It should be observed that my invention has been described employing a cathode ray tube bias circuit for maintaining the cathode ray tube at cutoff in the absence of a pulse signal developed in the bias circuit. This circuit could be modified by one knowledgeable in the art so that the cathode ray tube would be maintained conductive in the absence of the pulse signal developed in the bias circuit and cutoff when pulses are received.

Since many changes could be made in the above circuit and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In combination, an electron discharge device having a control grid and a cathode, a grid bias potential supply network having a negative terminal and a positive terminal and having a first leg and a second leg each connected between said first and second terminals, said first leg including a first resistance and a second resistance connected in series, said second leg including a third resistance having one end connected to said negative terminal, an impedance having one end connected to said positive terminal, and a potential regulating device having a cathode and an anode and being connected between and in series with said third resistance and said impedance so that its cathode is connected to said third resistance and its anode is connected to said impedance, said electron discharge device cathode being connected to the junction between said first and second resistances, and said electron discharge device grid being coupled to the cathode of said potential regulating device.

2. The combination set forth in claim 1 and a source of D.C. potential having its positive and negative terminals connected respectively to the positive and negative terminals of said network.

3. In combination, a cathode ray tube having a control grid and a cathode, a grid bias potential supply network connected between said grid and said cathode, said network including a potential regulating device having two electrodes, said network connection from said grid being through a D.C. path to one electrode of said regulating device and through a capacitor to the other electrode of said regulating device, said network further including a pulse developing impedance connected to said other electrode for producing a train of pulses to substantially change the potential between said grid and said cathode at predetermined intervals.

4. A cathode ray tube control circuit comprising, a cathode ray tube having a control grid and a cathode, a grid bias potential supply network connected between said grid and said cathode for maintaining said cathode ray tube in a normally blanked condition, a gating circuit including an electron flow device having an output electrode, said network including a pulse developing impedance connected in series with said output electrode, one of the ends of said impedance having a D.C. path to said cathode and the other end having a D.C. path to said grid, deflection means associated with said cathode ray tube for deflecting the cathode ray tube beam across the screen of said cathode ray tube, said gating circuit providing pulse signals to said impedance for unblanking said cathode ray tube in synchronism with the deflection of 5. A cathode ray tube control circuit comprising, a cathode ray tube having a control grid, a cathode and a horizontal beam deflecting means, a grid bias potential supply network connected between said grid and said cathode for maintaining said cathode ray tube in a normally blanked condition, a gating circuit maintained in a normally non-conductive condition, said network including a pulse developing impedance which also comprises a portion of said gating circuit, said impedance being characterized by an absence of a substantial potential drop across it when said cathode ray tube is non-conductive and when said gating circuit is non-conductive, means for coupling a sawtooth wave to said horizontal deflection means to deflect the cathode ray tube beam across the screen of said cathode ray tube, and means for coupling positive going pulses to said gating circuit in synchronism with the sweep interval portions of said sawtooth wave to render said gating circuit conductive to thus produce a potential drop across said impedance for unblanking said cathode ray tube.

6. A cathode ray tube control circuit comprising, a cathode ray tube having a control grid, a cathode and a horizontal beam deflecting means, a grid bias potential supply network connected between said grid and said cathode for maintaining said cathode ray tube in a blanked condition, a gating circuit maintained in a normally conductive condition, said network including a pulse developing impedance which also comprises a portion of said gating circuit, said impedance having a substantial potential drop across it when said cathode ray tube is conductive and as a result of said gating circuit being conductive, means for coupling a sawtooth wave to said horizontal deflection means to deflect the cathode ray tube beam across the screen of said cathode ray tube, and means for coupling negative going pulses to said gating circuit in synchronism with the retrace interval portions of said sawtooth wave to render said gating circuit non-conductive to thus eliminate said substantial potential drop across said impedance and thereby blank said cathode ray tube.

7. In combination, a cathode ray tube having a control grid and a cathode, a grid bias potential supply network connected between said grid and said cathode, said bias network including in series circuit relationship a pulse developing resistor and regulator means having a substantially constant potential maintained across the output terminals thereof, said series circuit being connected between said grid and said cathode for substantially changing the bias potential between said cathode and grid when a pulse is developed across said resistor, a gating circuit including an electron flow control device having an output electrode, and a power supply for operating said electron flow control device, said output electrode being connected between said resistor and said regulator means, said resistor being further connected in series between said output electrode and a terminal of said power supply to thereby provide pulses across said resistor when input signal pulses are applied to said gating circuit.

References Cited in the file of this patent

UNITED STATES PATENTS

| | | |
|---|---|---|
| 2,240,289 | Dillenburger | Apr. 29, 1941 |
| 2,465,406 | Taylor | Mar. 29, 1949 |
| 2,595,228 | Crist | May 6, 1952 |
| 2,602,909 | Reiches | July 8, 1952 |
| 2,709,768 | King | May 31, 1955 |
| 2,782,340 | Siskel | Feb. 19, 1957 |
| 2,994,802 | Shelby | Aug. 1, 1961 |

FOREIGN PATENTS

| | | |
|---|---|---|
| 703,332 | Great Britain | Feb. 3, 1954 |

UNITED STATES PATENT OFFICE

CERTIFICATE OF CORRECTION

Patent No. 3,069,593 December 18, 1962

William M. H. Willis

It is hereby certified that error appears in the above numbered patent requiring correction and that the said Letters Patent should read as corrected below.

Column 6, line 23, after "of" insert -- said beam across said screen. --.

Signed and sealed this 12th day of November 1963.

(SEAL)
Attest:

ERNEST W. SWIDER EDWIN L. REYNOLDS

Attesting Officer Acting Commissioner of Patents